Sept. 12, 1950  F. H. GUSDORF ET AL  2,522,035
DEVICE FOR CONTROLLING THE COUPLING BETWEEN
TWO INDUCTIVELY COUPLED CIRCUITS
Filed July 20, 1946

INVENTORS
FREDERIK HENDRIK GUSDORF &
EWOUD ADRIAAN VAN YEEREN
BY
AGENT

Patented Sept. 12, 1950

2,522,035

UNITED STATES PATENT OFFICE 2,522,035

DEVICE FOR CONTROLLING THE COUPLING BETWEEN TWO INDUCTIVELY COUPLED CIRCUITS

Frederik Hendrik Gusdorf and Ewoud Adriaan van Yzeren, Eindhoven, Netherlands, assignors to Hartford National Bank and Trust Company, Hartford, Conn., as trustee Application July 20, 1946, Serial No. 685,117
In the Netherlands August 9, 1943

Section 1, Public Law 690, August 8, 1946
Patent expires August 9, 1963

3 Claims. (Cl. 178—44)

This invention relates to a device for controlling the coupling between two inductively coupled circuits by displacing a primary coil pertaining to one of the circuits with respect to a secondary coil pertaining to the other circuit.

The known devices of this kind exhibit the drawback that the self-induction of the secondary circuit is dependent upon the position of the primary coil, so that the tuning of the secondary circuit changes when the coupling is varied. The invention has for its object to obviate this drawback.

According to the invention, simultaneously with the primary coil a compensating element is displaced for this purpose in the field of the secondary coil in such manner that the total self-induction of the secondary circuit remains constant or at least substantially constant.

The primary coil and the compensating element preferably are mechanically coupled with one another and jointly slidable in the axial direction with respect to the secondary coil.

The compensating element may consist, for example, of a short-circuited inductance coil which is moved further away from the secondary coil according as the primary coil is moved closer to the secondary coil and which is preferably congruent with the primary coil. In this case, the distance between the centres of the primary coil and of the compensating coil is preferably made equal or at least approximately equal to the length of winding of the secondary coil.

In a further embodiment of the invention, the compensating element consists of a body of conductive material, which is also removed farther from the secondary coil according as the primary coil is moved closer to the secondary coil.

The compensating element may also consist of a body of ferromagnetic material which, jointly with the primary coil, is moved towards the secondary coil and removed therefrom.

In the latter case the compensating element may consist of a core on which the primary coil is wound or of a layer applied to the body of the primary coil and consisting of a finely divided ferromagnetic material mixed with a binder.

The invention is partcularly suitable for the adjustment of the coupling between the aerial circuit and the first oscillatory circuit of a radio receiver for short waves, in order to adapt the impedance of the aerial to the impedance of the first oscillatory circuit.

When the device according to the invention is used in a radio receiver it may sometimes be advantageous to couple the device mechanically with at least one of the other adjusting members of the receiver. Thus, for example, the said device may be coupled with the tuning members in order to keep the sensitiveness and/or the band width constant throughout the whole of the tuning range.

In order that the invention may be clearly understood and readily carried into effect, it will now be explained more fully with reference to the accompanying drawing, in which.

Figure 1:
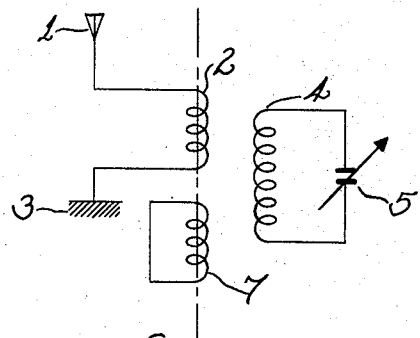
Fig. 1 illustrates an antenna circuit for a radio receiver embodying the coil arrangement according to the invention.

Fig. 1 represents part of a radio receiver for short waves wherein an aerial 1 is connected to earth 3 through the intermediary of a primary coil 2. The coil 2 is inductively coupled with a secondary coil 4 which, jointly with a variable condenser 5, forms the first oscillatory circuit of the receiver. In order to permit the coupling between the aerial circuit and the ocillatory circuit 4, 5 of being controlled, the primary coil 2 is mounted on a spindle 6 which is slidable in the axial direction with respect to the coil 4.

According to the invention, the detuning of the oscillatory circuit 4, 5 which is thus produced, is compensated, at least for the greater part, owing to the fact that on the shaft 6 is mounted a short-circuited compensating coil 7, which is moved farther away from the coil 4 according as the coil 2 is moved closer to the coil 4. The compensating coil 7 is preferably completely equal to the primary coil 2. It has been found that the change of the tuning which occurs upon adjustment of the coupling, is at its minimum if the distance between the centres of the coils 2 and 7 is equal or at least approximately equal to the length of winding of the coil 4.

Figure 2:
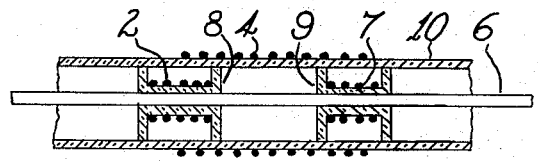
Fig. 2 is an antenna coil according to the invention.

Fig. 2 shows in detail one possible form of construction of the device according to Fig. 1, wherein the coils 2 and 7 are arranged on coil bodies 8 and 9 which are slidable by means of the spindle 6 within the coil cylinder 10 on which the coil 4 is wound.

Figure 3:
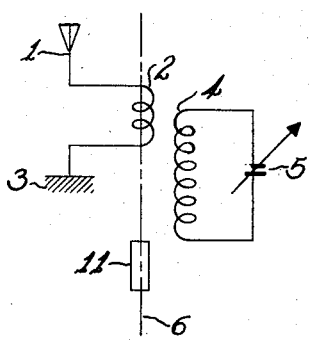
Fig. 3 is a second embodiment of an antenna circuit according to the invention.

Instead of the compensating coil 7 use may also be made of a body of conductive material, as denoted in Fig. 3 by 11, which body is displaced with respect to the coil 4 in the same manner as the coil 7.

Figure 4:
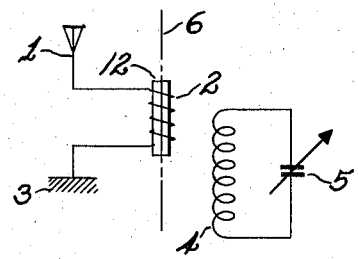
Fig. 4 is a third embodiment of an antenna circuit according to the invention.

Fig. 4 represents a device according to the invention wherein the compensating element consists of a body of ferro-magnetic material, viz. of a core 12 of finely divided iron, on which the primary coil 2 is wound and which, consequently, is always moved towards the coil 4 and away therefrom jointly with the coil 2.

It is also possible, under certain conditions, to use, instead of the core 12, a layer of finely divided ferromagnetic material mixed with a binder, which layer is applied to the body of the coil 2.

When carrying out the invention, it has proved to be possible to vary the coupling factor (K) between the aerial circuit and the first oscillatory circuit from 0.05 to 0.27, whereas the self-induction of the oscillatory circuit varied by 0.1 only.

With radio receivers it is frequently desirable to keep the sensitiveness and/or the band width constant during the tuning over a wide frequency range. It is known automatically to vary for this purpose the coupling between the aerial circuit and the first oscillatory circuit or between two circuits of a high-frequency band pass filter depending on the position of the tuning members, for example, by mechanically coupling an adjusting member for the said coupling with the tuning members. Also in this case use may advantageously be made of a device according to the invention, owing to which a change of the coupling is obtainable practically without variation of the self-induction of the coupled circuits.

What we claim is:

1. An antenna circuit for a radio receiver comprising an antenna coil, a resonant circuit inductively coupled to said antenna coil, a compensating element coaxial with and mechanically coupled to said antenna coil and inductively coupled with said resonant circuit, and means for simultaneously moving said coil and said compensating element relative to said resonant circuit so that the compensating element is moved further away as the antenna coil is moved toward the resonant circuit thereby maintaining the self-inductance of the resonant circuit substantially constant.

2. An antenna circuit for a radio receiver comprising an antenna coil, a resonant circuit including an inductance coil coupled with said antenna coil, a compensating coil having substantially the same configuration as said antenna coil coaxial with and mechanically coupled to the latter and spaced therefrom a distance between centers of the said coils approximately equal to the length of said inductance coil in said resonant circuit, and means for simultaneously moving said antenna coil and said compensating coil relative to the coil in said resonant circuit so that the compensating coil is moved further away from the coil in the resonant circuit as the antenna coil is moved toward the coil in the resonant circuit thereby maintaining the self-inductance of the coil in the resonant circuit substantially constant.

3. An antenna circuit for a radio receiver comprising an antenna coil, a resonant circuit inductively coupled to said antenna coil, a body of conductive material coaxial with and mechanically coupled to the antenna coil and inductively coupled to the resonant circuit, and means to simultaneously move the antenna coil and the body of conductive material so that the said body moves further away from the resonant circuit as the antenna coil moves toward the resonant circuit thereby maintaining the self-inductance of the resonant circuit substantially constant.

FREDERIK HENDRIK GUSDORF.
EWOUD ADRIAAN van YZEREN.

REFERENCES CITED

The following references are of record in the file of this patent:

UNITED STATES PATENTS

| Number | Name | Date |
|---|---|---|
| 2,111,373 | Schaper | Mar. 15, 1938 |
| 2,187,340 | Wilhelm et al. | Jan. 16, 1940 |
| 2,206,096 | Klotz | July 2, 1940 |
| 2,282,386 | Sinninger | May 12, 1942 |
| 2,285,128 | Rosenberg | June 2, 1942 |
| 2,389,986 | Koch | Nov. 27, 1945 |